United States Patent [19]
Johnston

[11] 3,733,603
[45] May 15, 1973

[54] RADAR TARGET IDENTIFICATION SYSTEM

[75] Inventor: Stephen L. Johnston, Huntsville, Ala.

[73] Assignee: The United States of America as represented by the Secretary of the Army, Washington, D.C.

[22] Filed: July 31, 1968

[21] Appl. No.: 749,538

[52] U.S. Cl. .................................343/5 SA, 343/7.7
[51] Int. Cl. ...............................................G01s 9/02
[58] Field of Search ...................343/5 R, 6.5 R, 7.7, 343/5 SA

[56] References Cited
UNITED STATES PATENTS

| | | |
|---|---|---|
| 3,478,354 | 11/1969 | Foster et al.............................343/5 R |
| 1,907,471 | 5/1933 | Alexanderson........................343/5 X |
| 2,659,076 | 11/1953 | Sherr......................................343/7.7 |
| 3,079,599 | 2/1963 | Caspers...........................343/7.7 UX |
| 3,360,796 | 12/1967 | Rush ......................................343/7.7 |

Primary Examiner—T. H. Tubbesing
Attorney—Harry M. Saragovitz, Edward J. Kelly, Herbert Berl and Aubrey J. Dunn

[57] ABSTRACT

This system utilizes the low frequency modulations of the signal from a radar which result from target scintillation and target motion. Outputs are provided for three types of identification — aural, frequency meter, and automatic recognition computer. A frequency multiplier may be used with the aural and frequency meter outputs.

1 Claim, 1 Drawing Figure

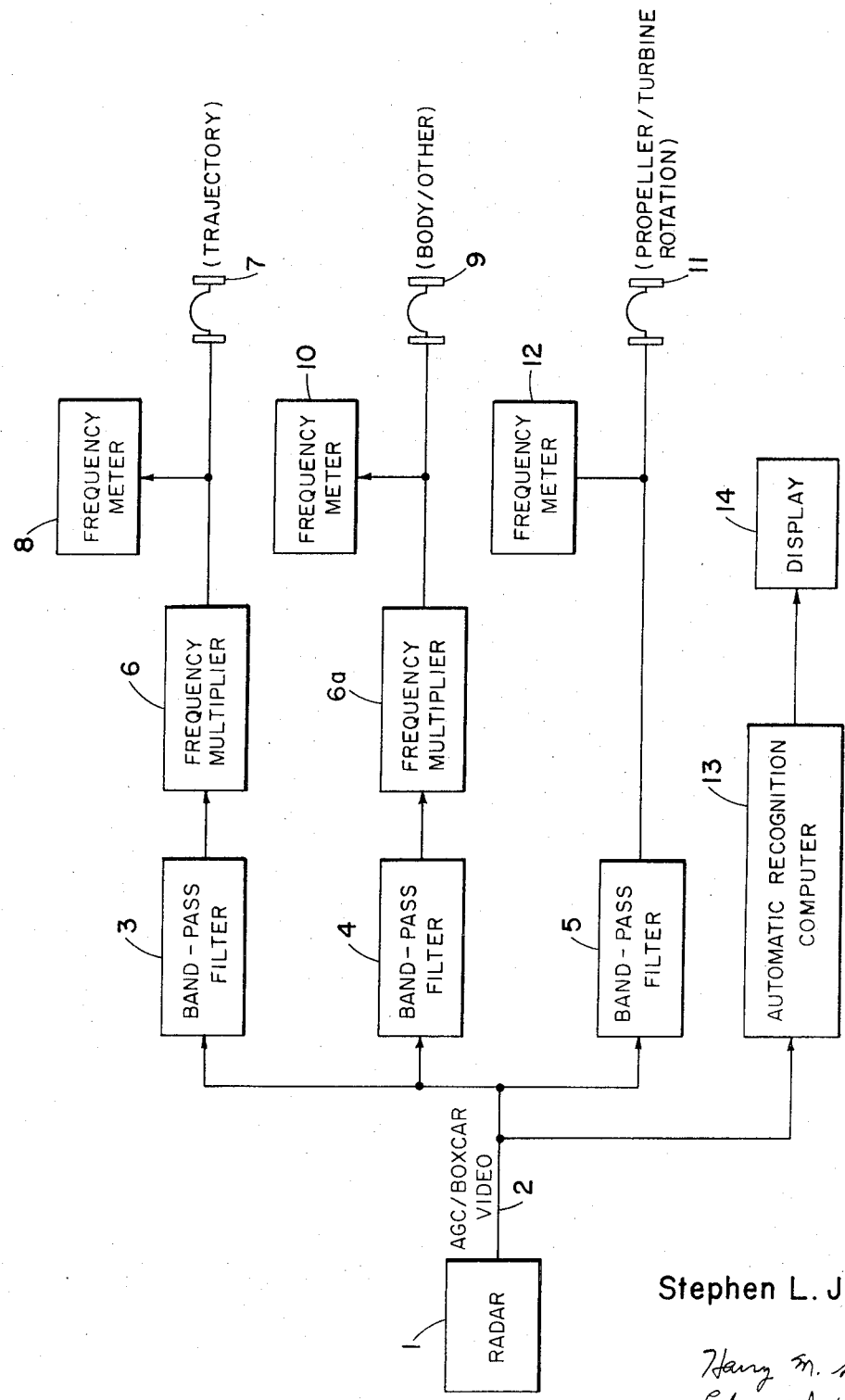

RADAR TARGET IDENTIFICATION SYSTEM

CROSS REFERENCE TO RELATED APPLICATIONS

An example of the frequency multiplier as mentioned above is the subject of U.S. Pat. application Ser. No. 702,455, filed Feb. 1, 1968 now U.S. Pat. No. 3,487,290. The present system may be used to advantage with the passive IFF system as disclosed in my U.S. Pat. application, Ser. No. 742,973, filed July 2, 1968 now abandoned.

BACKGROUND OF THE INVENTION

This invention generally deals with radar target identification. The commander of an air defense battery must have knowledge of whether a target is friendly or unfriendly in order to decide whether to attack it. This knowledge is provided by the well-known IFF. The battery commander would also like to know what kind of target — bomber, fighter, helicopter, or missile, and if a missile — what kind? Further, he should know how many targets are present in order to select the right defensive missile(s) and to optimize firing time(s). Current IFF systems are active, i.e., friendly aircraft carry an active IFF transponder which responds to an interrogator at the defensive battery acquisition radar. This concept gives no indication of the type of enemy target, but only that it is an enemy. The air defense battery may also be faced by tactical ballistic missiles, thus requiring more types of decisions. IFF is usually impractical for missiles, thus requiring more types of decisions. IFF is usually impractical for missiles. A passive, nontransponder-dependent system of target identification is desired.

There are several known passive target identification schemes. Trajectory observation by radar is simple and reasonably accurate. A heavy bomber does not usually fly at helicopter speeds and altitudes. However, a fighter can fly at bomber altitudes and speeds. A mortar round does not fly ICBM trajectories, but some mortar rounds and rockets have somewhat similar trajectories.

There are also various radar signature identifications that may be used; these include those listed below.
1. Propeller/Turbine Modulation
2. High Resolution Radar Cross Section
3. Frequency Shift (fine frequency)
4. Target Scintillation Propeller/turbine modulation (1.) is based on the principle that the radar cross section seen by an observing radar contains modulation components due to the rotation of propellers, helicopter rotors, turbines, or compressors. While this is a useful technique, it does have problems. Since an aircraft engine does not operate at a single constant speed, the problem is complicated. A further complication is that somewhat similar or greatly different aircraft may use the same engine. However, the modulation frequency may indicate whether the target is a jet aircraft, a propeller aircraft, or a helicopter.

In the high resolution concept (2.), a radar with extremely high range resolution is used to observe an aircraft. Resolution sufficient to isolate the radar return from each scatterer on the target must be used. The engine inlet, radomes, and pilot's cockpit will usually be the principle scatterers. Interpretation of results can be difficult under dynamic conditions, since the aircraft aspect angle may greatly and rapidly vary.

The frequency shift (fine frequency) (3.), concept is based on a second manifestation of the individual scatterers of the high resolution concept. If one considers a simple two-body scatter model of scatterers A and B separated by distance L, the resulting radar cross-section is:

$$\sigma_T = A + B \quad \sqrt{2AB} \sin ( 2\pi f/c, 2L(t) )$$

a change of frequency $\Delta f$ would thus be related to length. From this aircraft length can be measured so that a heavy bomber can be differentiated from a fighter.

The equation for the resultant radar cross section of the two body scatterer model shows a third manifestation. The interference pattern of the two scatterers produces a lobe structure, as seen in the typical radar cross section pattern of an aircraft or missile. A lobe has a width W of $C/(2fL \sin \theta)$ where $L \sin \theta$ is the projected target length, $f$ is the radar frequency, and C is the propagation constant.

If this lobe pattern is moved past an observer at an angular rate of $\theta\cdot$, then a scintillation frequency of $\theta\cdot/W$ results. For two scatterers separated by 30 ft. (i.e., a missile 30 ft. long), at S band with an aspect angular rate of 2°/sec., a scintillation frequency of approximately 4 Hz would result. The scintillation concept is thus a length aspect rate product measurement system.

SUMMARY OF THE INVENTION

This invention is a radar target identification system which takes advantage of the low frequency modulation of a radar echo amplitude resulting from target scintillation and motion. The targets may be identified by an operator listening to a frequency-multiplied version of the modulation. Also, targets may be identified by a frequency meter, or by an automatic recognition computer.

BRIEF DESCRIPTION OF THE DRAWING

The single drawing FIGURE is a block diagram of the invention.

DESCRIPTION OF THE PREFERRED EMBODIMENT

Echos from radar targets have been found to be modulated in amplitude as the result of three types of target motion — "normal" trajectory motion, body motion, and "other"motions. Trajectory motion is due to aeroballistic effects and missile attitude programming. Some types of missiles are launched onto a ballistic trajectory at an angle dependent on target range. Other missiles are launched vertically or near vertically and are then programmed in pitch angle.

Body motion includes the effects of wind gusts, guidance maneuvers, corkscrewing, nutation, and the like.

"Other" effects include missile spin, as with the Honest John or Lance missiles, effects of air brakes as in Sergeant, or configuration changes, as in Pershing missile separation.

Not all these modulations will be produced by any one missile. Fortunately, the different types of modulations are generally in different frequency regions, and are repeatable from one flight to another.

Recordings of the radar AGC of spinning missiles also contain a modulation which corresponds to a multiple of the rocket spin frequency.

From the study of static radar cross-section patterns, it has been found that the lobe width of a particular missile is proportional to the length of the missile and radar frequency. This lobe pattern is the cause of a trajectory scintillation frequency in a moving missile. Another quantity which determines scintillation frequency from trajectory motion is angular aspect rate.

The above described modulations or scintillation of radar signals must be properly processed and appropriately utilized to obtain a useful target identification system.

The invention may be best understood by reference to the drawing, in which reference numeral 1 designates a radar which observes the target. This radar is understood to include conventional transmitting and receiving circuits, and the usual antenna(s). An output signal from 1 is taken on lead 2. This output may be taken from the radar receiver AGC or may be a boxcar video. In either event, the scintillation frequencies of interest will be in the output. The output signal information on line 2 may be utilized in any one of several manners. One manner of use is that shown at the top of the drawing, wherein the signal from line 2 is applied to band pass filter 3. Filters 4 and 5 are also connected to line 2. The filters are so constructed that the particular frequencies of a target may be passed for respective utilization. In particular, filter 3 passes those scintillation frequencies associated with trajectory motion. The particular frequencies associated with a particular target may be recognized by a human operator. The scintillation frequencies are usually subaudible, and it is necessary to frequency multiply them for the operator. This multiplication may be done any one of several ways, such as by recording on tape at low speed, and playing at a higher speed. Another frequency multiplication scheme is that shown in my co-pending application having Ser. No. 702,455, filed Feb. 1, 1968. A frequency multiplication is performed in box 6 of the drawing, with the output of 6 applied to earphones 7 for an operator. This output may be also applied to frequency meter 8.

The frequencies for body motion and/or other motion may be treated similar to those for trajectory motion. The output of band-pass filter 4 is applied to frequency multiplier 6a, with the output of 7 applied to earphones 9 or frequency meter 10.

The propeller or turbine motion frequencies are high enough that a frequency multiplier is not necessary, and the output of filter 5 is directly applied to earphones 11 and/or frequency meter 12.

With the above described circuit arrangement, the identification of a radar target may be made by trained operators using earphones 7, 9 and 11 and/or observing meters 8, 10 and 12.

Targets may also be identified by an automatic recognition computer 13 connected to line 2. This computer may give an output to a display device 14. Various types of recognition computers are known which are capable of target recognition. One type of computer is that described in the article "Adaptive Pattern Recognition and Signal Detection Without Supervision" by David B. and Paul W. Cooper. This article appeared on pages 246-256 of the 1964 IEEE International Convention Record, Part 1. Another example of a computer which may be used in this invention is that described in the 1965 IEEE International Convention Record, on pages 181-189 of Part 6, Volume 13. Yet another example is found in Volume 72 (Feb. 1965) of American Mathmetics Monthly, on pages 111-118.

As mentioned briefly above, the invention may be used for IFF. A friendly target may carry some means for periodically altering its radar cross-section in some predetermined pattern. The means may consist of a rotating corner reflector or Luneberg lens, as taught in my co-pending application having Ser. No. 742,973, filed July 2, 1968. In any event, a scintillation frequency should be generated which is recognizable by an operator or computer. If desired, one could have one's missile whistle "Dixie"!

In this device the multiplication of the frequency multiplier may be changed if desired to compensate for the effect of the use of different radar frequency bands in different radars. For example, if this device is used with both S band and X band radars for the same target types, the frequency multiplier in the device for use with the S band radar could have a multiplication of four or five times (depending on the ratio of the two radar frequencies) that of the multiplier for the X band radar application. This would cause the multiplied scintillation frequencies from the two radars to the nearly equal and thus facilitate operator training.

The outputs from this device can be transmitted over conventional voice frequency communication channels to permit remote target identification or comparison of the outputs from two separately located radars which use the same or different frequencies.

Other applications of this device are:

1. Counter Mortar/Counter Rocket/Counter Battery

In this problem a computer uses radar derived trajectory data to determine the rocket/mortar/missile launch or impact point. It is essential that the proper drag function for the target being observed be used in the trajectory extrapolation computer. This device will provide proper identification so that an operator or automatic circuitry can select the correct drag function based on the target scintillation/body motion frequencies.

2. Low Altitude Target Tracking

In tracking targets in the low altitude region severe problems can result from the presence of ground clutter. The output signals from this device can be used as a means for monitoring the performance of a radar tracking a low altitude target (either manually or automatically) to determine whether the target is still being tracked or is lost in the clutter. Outputs of this device can also be used to automatically control the tracking of a target in clutter as a means for discrimination against clutter. This also applies to tracking a target in chaff.

3. Decoy/Booster/Reentry Vehicle Discrimination

The outputs of this device can be used for discrimination of decoys, booster and reentry vehicles due to differences of scintillation frequencies and body motion frequencies of these objects.

4. Changes of Target Characteristics

Outputs of this device can be used to detect change of the radar signature characteristics of various targets such as aircraft, missile rockets. If a target of known type is observed by radar on a number of occasions and this device is used, any modification of the target which changes its radar signature will result in changes of the outputs of this device.

5. Target Glint Characteristics

Output of the scintillation channel of this device can be used to provide an approximation of the glint characteristics of a target to give an indication of possible miss distance of a radar guided missile due to target glint noise.

6. Missile Flight Testing Aid

The outputs of this device can facilitate flight testing of missile to detect missiles breakups, initiation of tumbling, stage separation etc.

7. Warhead Identification

The outputs of this device can provide approximate information on warhead type, burst pattern, effects and the like due to differences in scintillation frequencies at the time of warhead event.

8. Decoy/Multiple Warhead Ejection

The outputs of this device can be used to detect the occurrence of decoy/multiple warhead ejection from a ballistic missile. Knowledge of the missile altitude from radar data will give further information in that a decoy is generally ejected at high altitudes whereas a multiple warhead would generally occur at a different altitude region.

I claim:

1. A radar target identification system including means for illuminating a target with radar energy, receiving echos having subaudible frequency components from said target, and providing an output indicative of the variation of the amplitude of said echos; and recognition means for identifying said subaudible frequency components connected to and responsive to said output wherein said recognition means includes a band-pass filter connected to said output; frequency sensitive means; and frequency multiplier means connected between said filter and said frequency sensitive means.

* * * * *